UNITED STATES PATENT OFFICE.

VIGGO BEUTNER DREWSEN, OF EIDSVOLD, NORWAY.

PROCESS OF RECOVERING ORGANIC SUBSTANCES FROM SULPHITE LIQUOR.

SPECIFICATION forming part of Letters Patent No. 505,755, dated September 26, 1893.

Application filed March 1, 1892. Serial No. 423,405. (No specimens.)

*To all whom it may concern:*

Be it known that I, VIGGO BEUTNER DREWSEN, a subject of the King of Sweden and Norway, and a resident of Eidsvold, in Norway, have invented a certain new and useful improvement in the method of purifying the liquid which has been used in the manufacture of cellulose and the production of useful products of the same, of which the following is a specification.

It is a well known fact that in the spent liquor resulting from the manufacture of cellulose by the sulphite process caustic lime will at ordinary temperature, or by boiling without pressure, precipitate large quantities of organic matter and the sulphurous acid, which is traceable by common reagents, as for instance, solution of iodine, both in connection with lime. The precipitate which is got in this manner, is however, completely soluble in acid, as for instance hydrochloric acid. Now I have found that the reaction between the spent sulphite liquor and caustic lime, at temperatures higher than 100° Celsius and under pressure, is of an essential difference because the precipitate, which is got under these circumstances, is only partly soluble by treatment with an acid, as for instance hydrochloric acid, the organic substances being insoluble, whereas the inorganic substances will go in solution. At the same time will be gained, at higher temperatures and pressures, great quantities of sulphurous acid which are in the spent liquor in close connection with the organic matter and which are not traceable by common reagents as for instance, solution of iodine.

I carry out my process in the following way: The spent liquor as free as possible from sulphurous acid is blown over into a steam tight vessel, provided with a stirrer, and in which the desired quantity of caustic lime, as free as possible from carbonic acid, has already been inserted. When the liquor is completely blown over, the steam is turned on and the stirrer put in motion, the temperature being kept up, till it appears by testing, that the reaction is completed. The contents of the vessel are then run through a filter press, and the contents of the press, which consist in the lime compounds of the incrusted organic substances together with mono-sulphite of lime, are now treated with a strong acid ($H_2SO_3$ or $HCl$), by which means the organic substances are obtained in a free state, insoluble in water and acids, whereas the lime and sulphurous acid, now in soluble form, are separated by filtration.

The following forms give an idea of the reactions:

1.

[Spent liquor + $Ca(OH)_2$] = Ca, organic substances + $CaSO_3$, (precipitate No. 1).

2 (*a* and *b*).

*a*—Treatment of precipitate No. 1 with $H_2SO_3$.

*b*—Treatment of precipitate No. 1 with HCl.

*a*) Ca, organic substances + $CaSO_3$ (precipitate No. 1) + $H_2SO_3$ = organic substances (precipitate No. 2, insoluble) + $CaSO_3$ + $H_2O$.

$CaSO_3 + H_2SO_3 = CaH_2(SO_3)_2$ (soluble in water).

*b*) Ca, organic substances + $CaSO_3$ (precipitate No. 1) + 2HCl = organic substances (precipitate No. 2, insoluble) + $CaSO_3$ + $CaCl_2 + H_2O$.

$2CaSO_3 + 2HCl = CaCl_2 + CaH_2(SO_3)_2$ (soluble in water).

As can be seen from the scheme above, by treatment of precipitate No. 1 with acids, (either sulphurous acid or hydrochloric acid,) the inorganic compound will go in solution as compound of lime, whereas the organic substances will remain undissolved. By ordinary filtration and washing out the substances can be separated from one another and may serve different technical purposes.

What I claim as my invention is—

The herein described process of recovering organic substances, insoluble in water and acids, from the liquor resulting from the manufacture of cellulose by the sulphite process, which consists in converting the organic substances into a compound with lime by treating the liquor with caustic lime at a temperature higher than 100° Celsius and under pressure, a large quantity of sulphur being at the same time precipitated as monosulphite of lime,—and treating the precipitate with a strong acid (sulphurous acid, hydrochloric acid), whereby the organic substances are obtained in a form insoluble in water and acid, whereas on the other side the sulphurous acid and the other inorganic substances are made soluble in water, substantially as described.

In testimony that I claim the foregoing as my invention I have signed my name, in presence of two witnesses, this 29th day of January, 1892.

VIGGO BEUTNER DREWSEN

Witnesses:
M. PAULSSEN,
T. F. ECKERSBERG.